United States Patent [19]
Deng et al.

[11] Patent Number: 5,803,741
[45] Date of Patent: Sep. 8, 1998

[54] APPARATUS FOR INSCRIBING BRAILLE CHARACTERS ON A SHEET OF PAPER

[76] Inventors: Jyh-Jeng Deng, No. 451, Lu-Kuang-I Tsun, Wu-Ku Hsiang, Taipei Hsien; Ming-Hung Sung, No. 7, Alley 7, Lane 808, Nan-Ta Rd., Hsin-Chu City, both of Taiwan

[21] Appl. No.: 854,408

[22] Filed: May 12, 1997

[51] Int. Cl.⁶ .................................................. G09B 21/02
[52] U.S. Cl. ........................................... 434/115; 434/418
[58] Field of Search ................................. 434/115, 117, 434/112, 113, 89, 88, 412, 411, 418, 422

[56] References Cited

U.S. PATENT DOCUMENTS

| | | | |
|---|---|---|---|
| 1,175,951 | 3/1916 | Greene | 434/115 |
| 1,293,023 | 2/1919 | Bryan et al. | 434/115 |
| 1,800,130 | 4/1931 | Brown | 434/115 |
| 2,565,608 | 8/1951 | Hoff | 434/115 |
| 3,340,625 | 9/1967 | Supitolov | 434/115 |
| 4,139,965 | 2/1979 | Curry et al. | 434/84 |
| 5,213,504 | 5/1993 | Lee et al. | 434/142 |

*Primary Examiner*—Paul J. Hirsch
*Attorney, Agent, or Firm*—Merchant, Gould, Smith, Edell, Welter & Schmidt

[57] ABSTRACT

An apparatus for inscribing braille characters includes a base, a composing ruler fixed to a front edge portion of the base, and a punching pen for inscribing braille characters on a paper sheet disposed slidably within the composing ruler. A rear edge portion of the base has a roller shaft journalled thereon and a rotatable abutment member which is disposed under the roller shaft in order to clamp the paper sheet between the roller shaft and the rotatable abutment member. Therefore, the paper sheet can be moved forward and backward by rotating the roller shaft.

3 Claims, 6 Drawing Sheets

APPARATUS FOR INSCRIBING BRAILLE CHARACTERS ON A SHEET OF PAPER

BACKGROUND OF THE INVENTION

1. Field of the Invention

This invention relates to an apparatus for inscribing braille characters on a sheet of paper, more particularly to an apparatus for inscribing braille characters on a sheet of paper which can be moved by means of a roller shaft of the apparatus.

2. Description of the Related Art

Referring to FIG. 1, a conventional apparatus 10 for inscribing braille characters on a sheet of paper (not shown) is shown to comprise a base board 11, an elongated composing ruler 12 and a punching pen 13. The top edge portion of the base board 11 has a clip member 111 for positioning the paper sheet on the base board 11. The opposite side portions of the base board 11 have a plurality of equally spaced holes 112 formed therein. The composing ruler 12 includes a lower plate 121 and an upper plate 122 disposed spacedly over the lower plate 121. One end of the upper plate 122 is connected pivotably to an end of the lower plate 121. The lower plate 121 has a plurality of cavity matrices 123 which are arranged longitudinally and spacedly therein. The upper plate 122 has a plurality of openings 124 which are aligned correspondingly with the sets of cavity matrices 123. The bottom side of the lower plate 121 has two positioning pillars 125 adjacent to two ends thereof. The positioning pillars 125 can be inserted selectively into two aligned holes 112 on either side portion of the base board 11 so that the composing ruler 12 can be positioned transversely on the base board 11. In use, the composing ruler 12 is positioned on the base board 11 as described above, and the lower and upper plates 122, 121 are staggered with one another, as best illustrated in FIG. 1. Next, the paper sheet (not shown) is clipped to the base board 11 by means of the clip member 111, and is disposed on the lower plate 121. The upper plate 122 is pivoted to overlap the lower plate 121 in order to clamp the paper sheet between the lower and upper plates 121, 122. Thus, braille characters can be inscribed on a certain line of the paper sheet through one of the openings 124 and a corresponding one of the sets of cavity matrices 123 by means of a tip 131 of the punching pen 13. When the user wants to inscribe braille characters on another line of the paper sheet, the composing ruler 12 must be detached from the base board 11 and moved for positioning on another portion of the base board 11 as described above, thereby inconveniencing the user.

SUMMARY OF THE INVENTION

The object of the present invention is to provide an apparatus for inscribing braille characters on a paper sheet which can be used conveniently.

According to the present invention, the apparatus for inscribing braille characters on a sheet of paper comprises:

an elongated base having front and rear edge portions, two opposite end portions which interconnect the front and rear edge portions, a pair of journal seats formed at the end portions adjacent to the rear edge portion of the base, and a rotatable abutment member disposed on the base between the journal seats;

an elongated composing ruler fixed longitudinally to the front edge portion of the base and having upper and lower plates spacedly connected to one another in a parallel relationship, thereby defining a clearance therebetween in order to provide an access for the paper sheet, the lower plate having a plurality of sets of cavity matrices which are arranged longitudinally and spacedly therein, the upper plate having a plurality of openings which are aligned correspondingly with the sets of cavity matrices;

a punching pen with a tip for inscribing a braille character on the paper sheet through one of the openings and a corresponding one of the sets of cavity matrices when the paper sheet is disposed between the upper and lower plates of the composing ruler; and a roller shaft journalled on the journal seats and contacting the rotatable abutment member, the roller shaft having two knobs connected to two ends thereof, each of the knobs having a rotary shaft and a plurality of equally spaced grooves circumferentially formed around the rotary shaft, each of the journal seats having a spring-loaded latch member which engages one of the grooves of a respective one of the knobs.

The paper sheet clamped between the roller shaft and the rotatable abutment member can be moved forward and backward by a predetermined distance by rotating the knobs of the roller shaft in order to enable each of the spring-loaded latch members to disengage one of the grooves so as to engage an adjacent one of the grooves of the respective one of the knobs.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
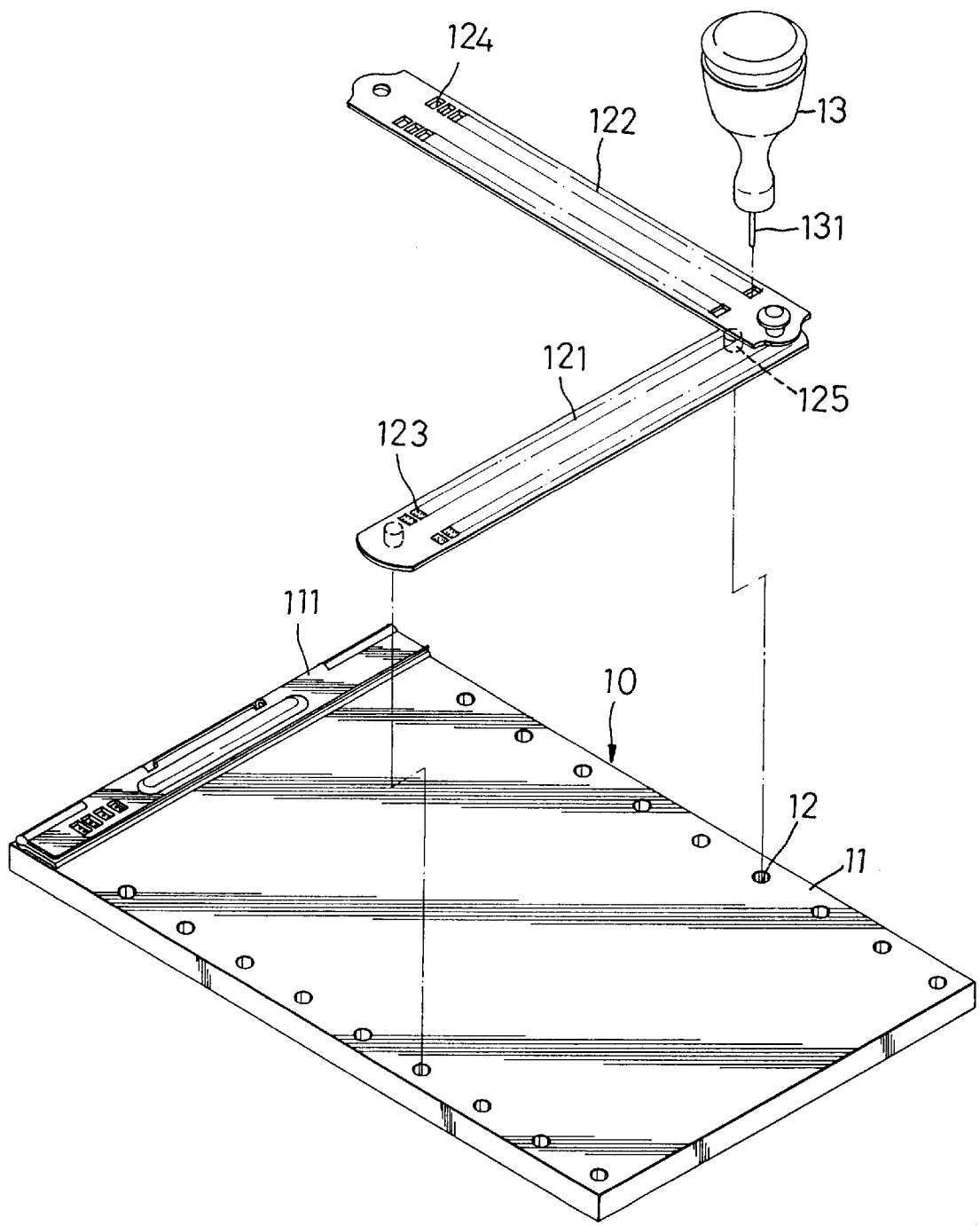
FIG. 1 is an exploded view of a conventional apparatus for inscribing braille characters on a sheet of paper.
Figure 2:
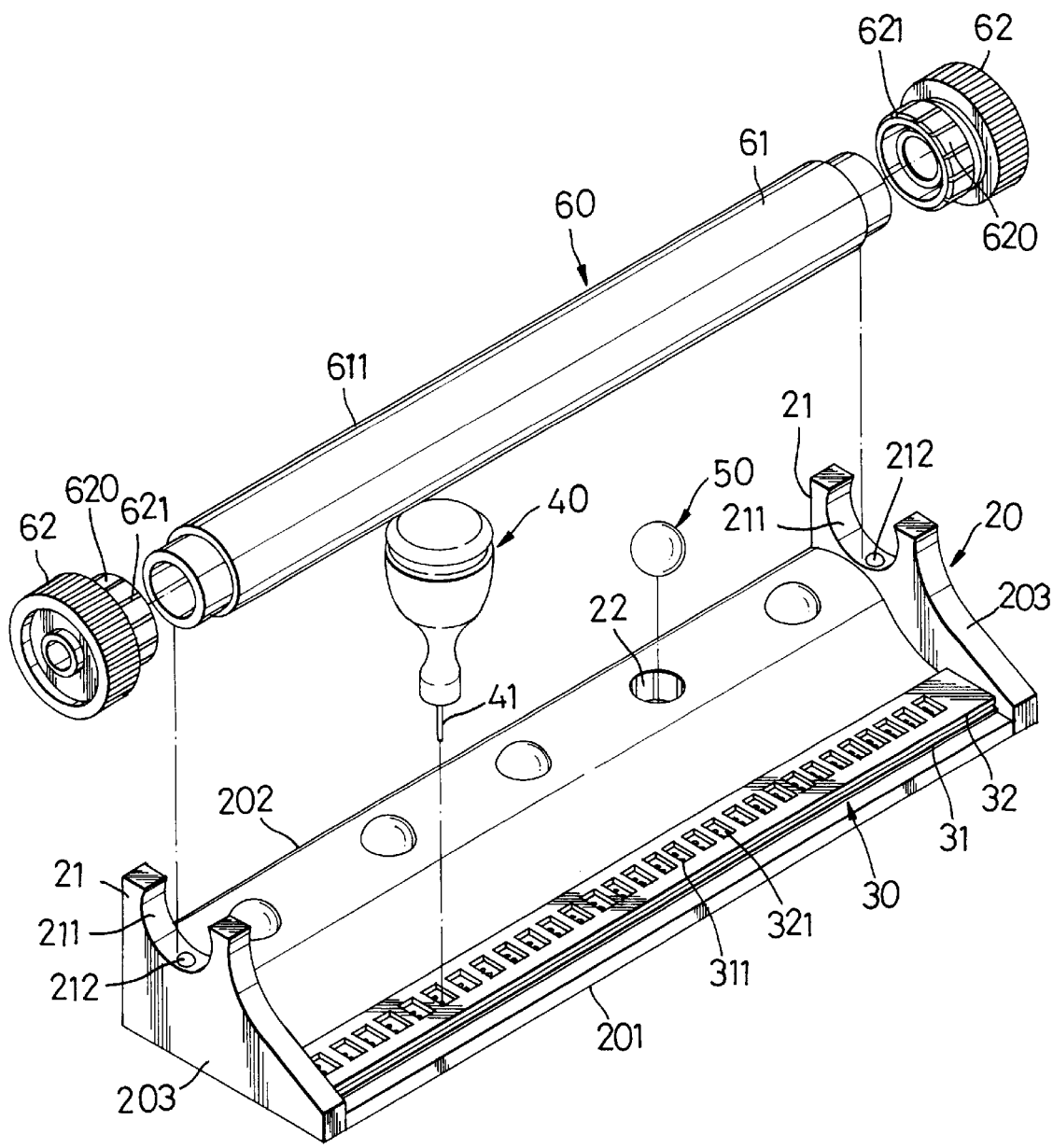
FIG. 2 is an exploded view of a preferred embodiment of an apparatus for inscribing braille characters on a sheet of paper according to the present invention.
Figure 3:
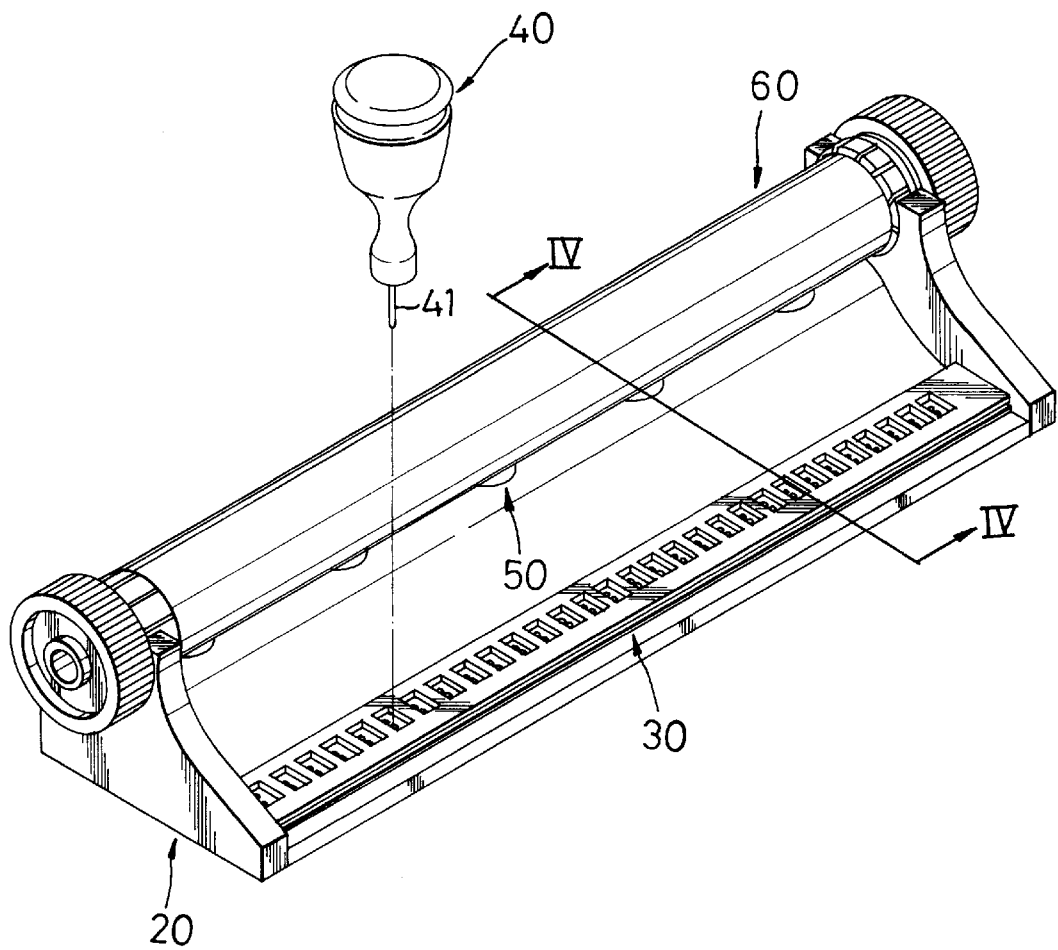
FIG. 3 is a perspective view of the preferred embodiment of the present invention.

Referring to FIGS. 2 and 3, a preferred embodiment of an apparatus for inscribing braille characters on a sheet of paper 200 (see FIG. 5) according to the present invention is shown to comprise an elongated base 20, a composing ruler 30, a punching pen 40, a rotatable abutment member 50 and a roller shaft 60.

The base 20 has front and rear edge portions 201, 202, and two opposite end portions 203 which interconnect the front and rear edge portions 201, 202. The upper face of the base 20 inclines downward from the rear edge portion 202 to the front edge portion 201. A pair of journal seats 21 is formed at the end portions 203 adjacent to the rear edge portion 202 of the base 20. Each of the journal seats 21 is formed with a concave portion 211 and a spring-loaded latch member 212 mounted in the bottom of the concave portion 211. In this embodiment, the spring-loaded latch member 212 is a spring-loaded ball.

Figure 4:
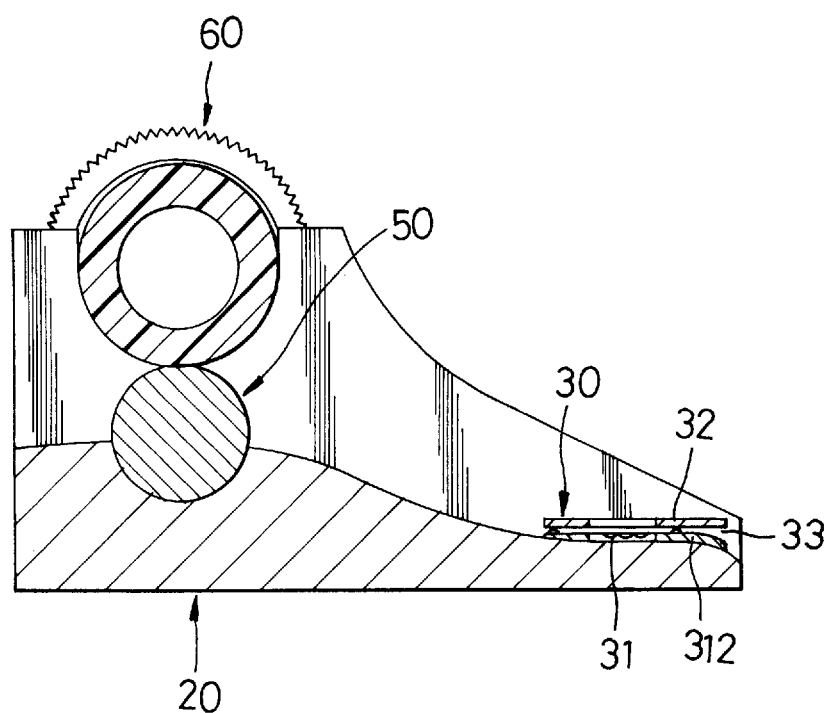
FIG. 4 is a cross sectional view taken along the line IV—IV in FIG. 3.

Referring to FIGS. 2, 3 and 4, the composing ruler 30 is fixed longitudinally to the front edge portion 201 of the base 20, and has upper and lower plates 32, 31 spacedly connected to one another in a parallel relationship, thereby defining a clearance 33 therebetween in order to provide an access for the paper sheet 200. The lower plate 31 has a plurality of sets of cavity matrices 311 which are arranged longitudinally and spacedly therein. The upper plate 32 has a plurality of openings 321 which are aligned correspondingly with the sets of cavity matrices 311 in a manner similar to that of the prior art. The lower plate 31 of the composing ruler 30 has a downwardly curved edge 312 formed adjacent to the front edge portion 201 of the base 20 in order to facilitate access of the paper sheet 200 into the clearance 33 of the composing ruler 30.

The structure of the punching pen 40 is the same as that of the punching pen 13 of the prior art. That is, the tip 41 of the punching pen 40 is used to inscribe a braille character 24 on the paper sheet 200 through one of the openings 321 and a corresponding one of the sets of cavity matrices 311 when the paper sheet 200 is disposed between the upper and lower plates 32, 31 of the composing ruler 30, as best illustrated in FIG. 5.

Referring to FIGS. 2 and 3, a rotatable abutment member 50 is disposed on the base 20 between the journal seats 21. The rotatable abutment member 50 includes a plurality of balls embedded partially and rotatably in semi-spherical holes 22 formed in the base 20.

The roller shaft 60 is journalled in the concave portions 211 of the journal seats 21 and contacts the rotatable abutment member 50. The roller shaft 60 has two knobs 62 connected to two ends thereof. Each of the knobs 62 has a rotary shaft 620 and a plurality of equally spaced grooves 621 circumferentially formed around the rotary shaft 620. The spring-loaded latch member 212 in each of concave portions 211 of the journal seats 21 engages one of the grooves 621 of a respective one of the knobs 62.

Figure 5:
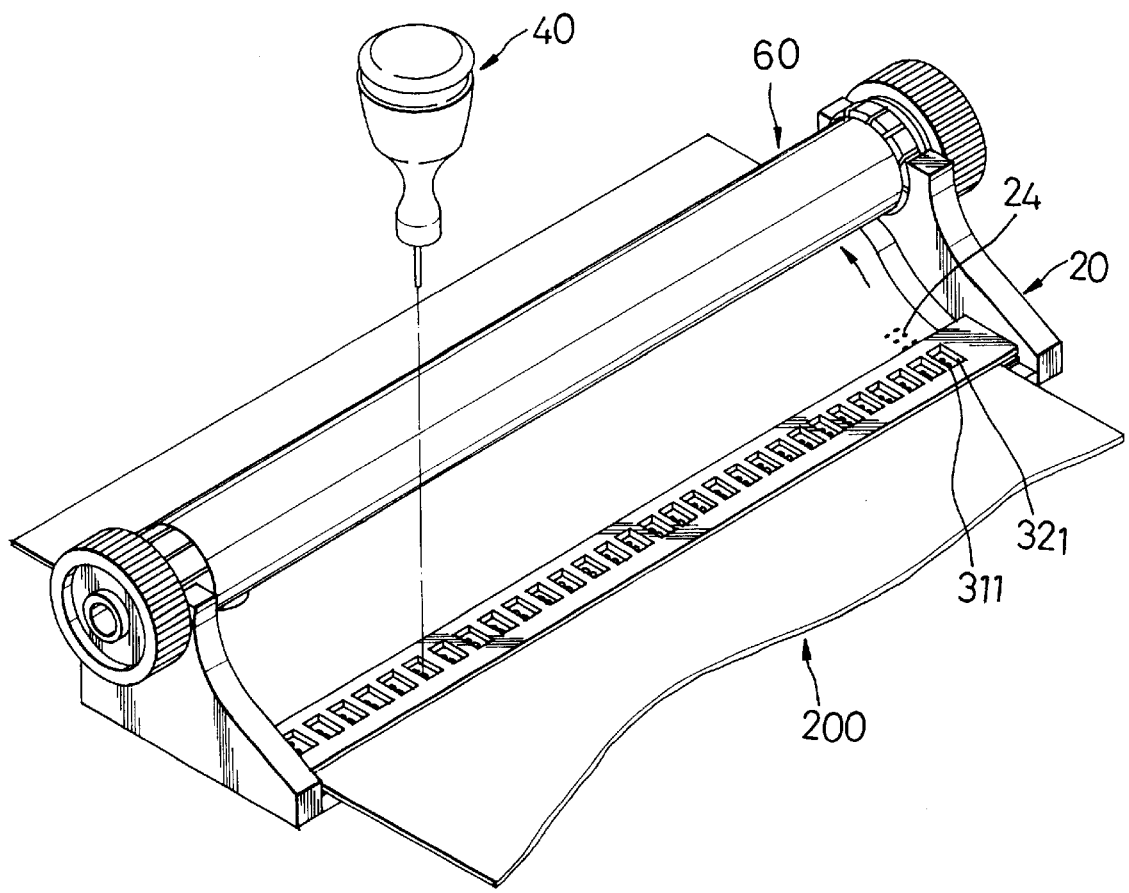
FIG. 5 is a perspective schematic view illustrating how the preferred embodiment is used.

Referring to FIG. 5, the paper sheet 200 clamped between the roller shaft 60 and the rotatable abutment member 50 can be moved forward and backward by a predetermined distance by rotating the knobs 62 of the roller shaft 60 in order to enable each of the spring-loaded latch members 212 to disengage one of the grooves 621 and engage an adjacent one of the grooves 621 of the respective one of the knobs 62. Therefore, the user can inscribe braille characters 24 conveniently and precisely from one line to another on the paper sheet 200 by simply rotating the roller shaft 60.

Figure 6:
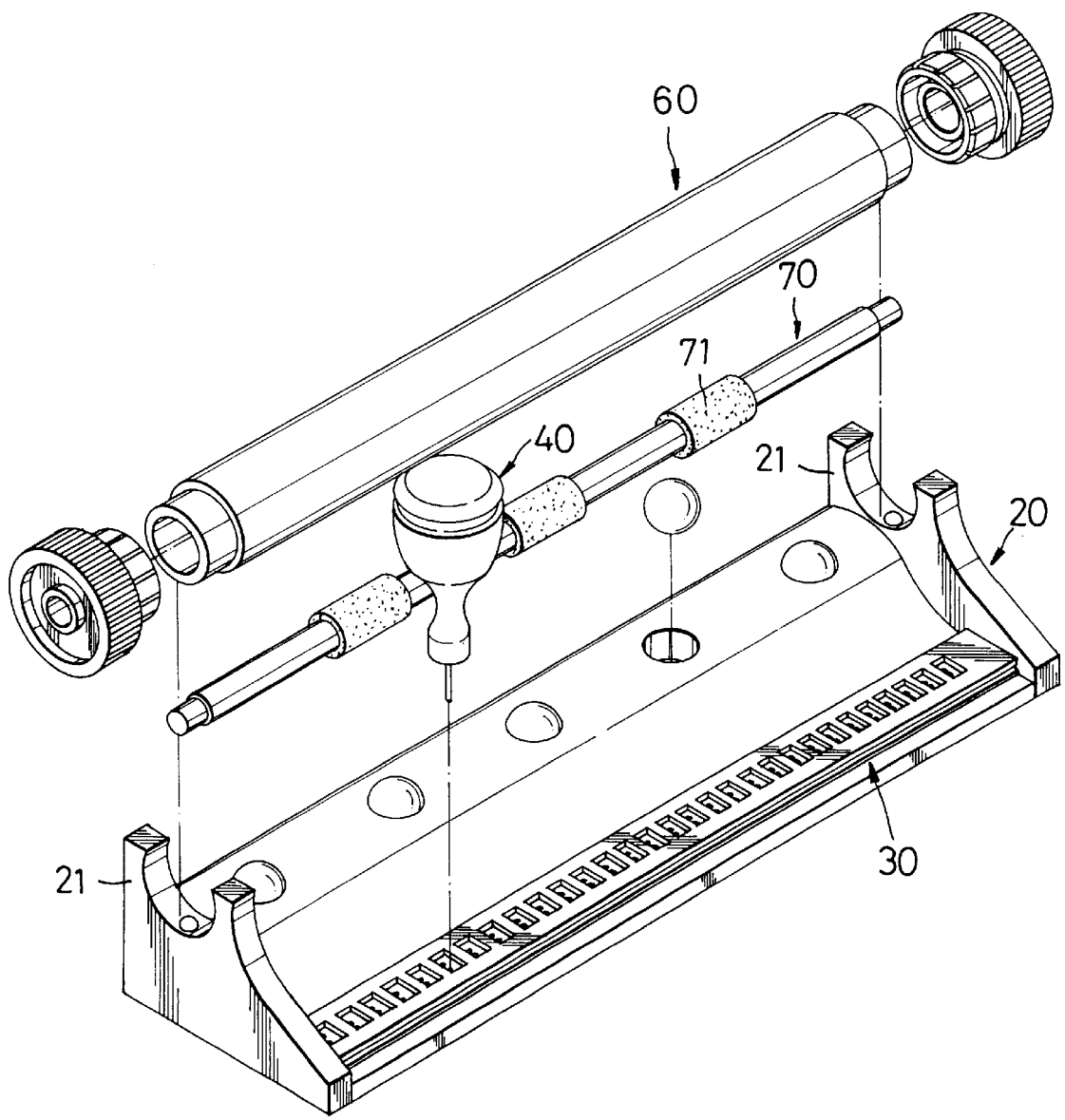
FIG. 6 is an exploded view of another preferred embodiment of an apparatus for inscribing braille characters on a sheet of paper according to the present invention.

FIG. 6 shows another preferred embodiment of an apparatus for inscribing braille characters on a sheet of paper according to the present invention. In this embodiment, the structure of the apparatus is similar to that of the apparatus of the first embodiment, except that the rotatable abutment member 70 is formed as a rod member 70 which is journalled on the journal seats 21 at two ends thereof under the roller shaft 60. The rod member 70 has several rubber rings 71 mounted thereon in order to contact the roller shaft 60 with an enhanced friction force.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangement.

I claim:

1. An apparatus for inscribing braille characters on a sheet of paper, comprising:

an elongated base having front and rear edge portions, two opposite end portions which interconnect said front and rear edge portions, a pair of journal seats formed at said end portions adjacent to said rear edge portion of said base, and a rotatable abutment member disposed on said base between said journal seats, said rotatable abutment member includes a plurality of balls embedded partially and rotatably in said base;

an elongated composing ruler fixed longitudinally to said front edge portion of said base and having upper and lower plates spacedly connected to one another in a parallel relationship, thereby defining a clearance therebetween in order to provide an access for said paper sheet, said lower plate having a plurality of sets of cavity matrices which are arranged longitudinally and spacedly therein, said upper plate having a plurality of openings which are aligned correspondingly with said sets of cavity matrices;

a punching pen with a tip for inscribing a braille character on said paper sheet through one of said openings and a corresponding one of said sets of cavity matrices when said paper sheet is disposed between said upper and lower plates of said composing ruler; and a roller shaft journalled on said journal seats and contacting said rotatable abutment member, said roller shaft having two knobs connected to two ends thereof, each of said knobs having a rotary shaft and a plurality of equally spaced grooves circumferentially formed around said rotary shaft, each of said journal seats having a spring-loaded latch member which engages one of said grooves of a respective one of said knobs;

whereby, said paper sheet clamped between said roller shaft and said rotatable abutment member can be moved forward and backward by a predetermined distance by rotating said knobs of said roller shaft in order to enable each of said spring-loaded latch members to disengage said one of said grooves and engage an adjacent one of said grooves of the respective one of said knobs.

2. The apparatus for inscribing braille characters on a sheet of paper as claimed in claim 1, wherein said spring-loaded latch member includes a spring-loaded ball.

3. The apparatus for inscribing braille characters on a sheet of paper as claimed in claim 1, wherein said lower plate of said composing ruler has a downwardly curved edge formed adjacent to said front edge portion of said base in order to facilitate access of said paper sheet into said clearance of said composing ruler.

* * * * *